United States Patent [19]

Migliardi et al.

[11] 4,159,429

[45] Jun. 26, 1979

[54] ELECTRONIC TRACER UNIT FOR MEASURING MACHINES

[75] Inventors: Gianfranco Migliardi; Francesco Germano, both of Turin; Ugo Cavicchioli, Borgaro Torinese, all of Italy

[73] Assignee: Dea Digital Electronic Automation S.p.A., Moncalieri, Italy

[21] Appl. No.: 804,822

[22] Filed: Jun. 8, 1977

[30] Foreign Application Priority Data

Jun. 9, 1976 [IT] Italy ............................ 68400 A/76
May 4, 1977 [IT] Italy ............................ 67998 A/77

[51] Int. Cl.² ........................................ H01H 35/00
[52] U.S. Cl. .................................. 307/115; 307/119; 200/61.41; 200/61.42; 318/578; 318/656; 318/672
[58] Field of Search .................. 307/113, 115, 119; 200/61.41, 61.42; 318/578, 656, 648, 672; 324/158 P; 340/678

[56] References Cited

U.S. PATENT DOCUMENTS

| | | | |
|---|---|---|---|
| 3,628,052 | 12/1971 | Mitchell | 307/115 |
| 3,819,047 | 6/1974 | Sorbie | 200/61.42 |
| 4,023,045 | 5/1977 | Migliardi et al. | 307/119 |

Primary Examiner—J. V. Truhe
Assistant Examiner—Eugene S. Indyk
Attorney, Agent, or Firm—Ladas, Parry, Von Gehr, Goldsmith & Deschamps

[57] ABSTRACT

A tracer unit for use with measuring machines is described.

The main feature of this tracer unit is to comprise a plurality of tracer tools, each of which is provided with a rod arranged to come into contact with a surface to be scanned, a movable body connected to said rod, a fixed body, first means which supply a first signal either when said movable body leaves the position of equilibrium relative to said fixed body or when said movable body passes through a determined position relative to said fixed body, and second means arranged to indicate from which of the various tracer tools said first signal is originated.

19 Claims, 13 Drawing Figures

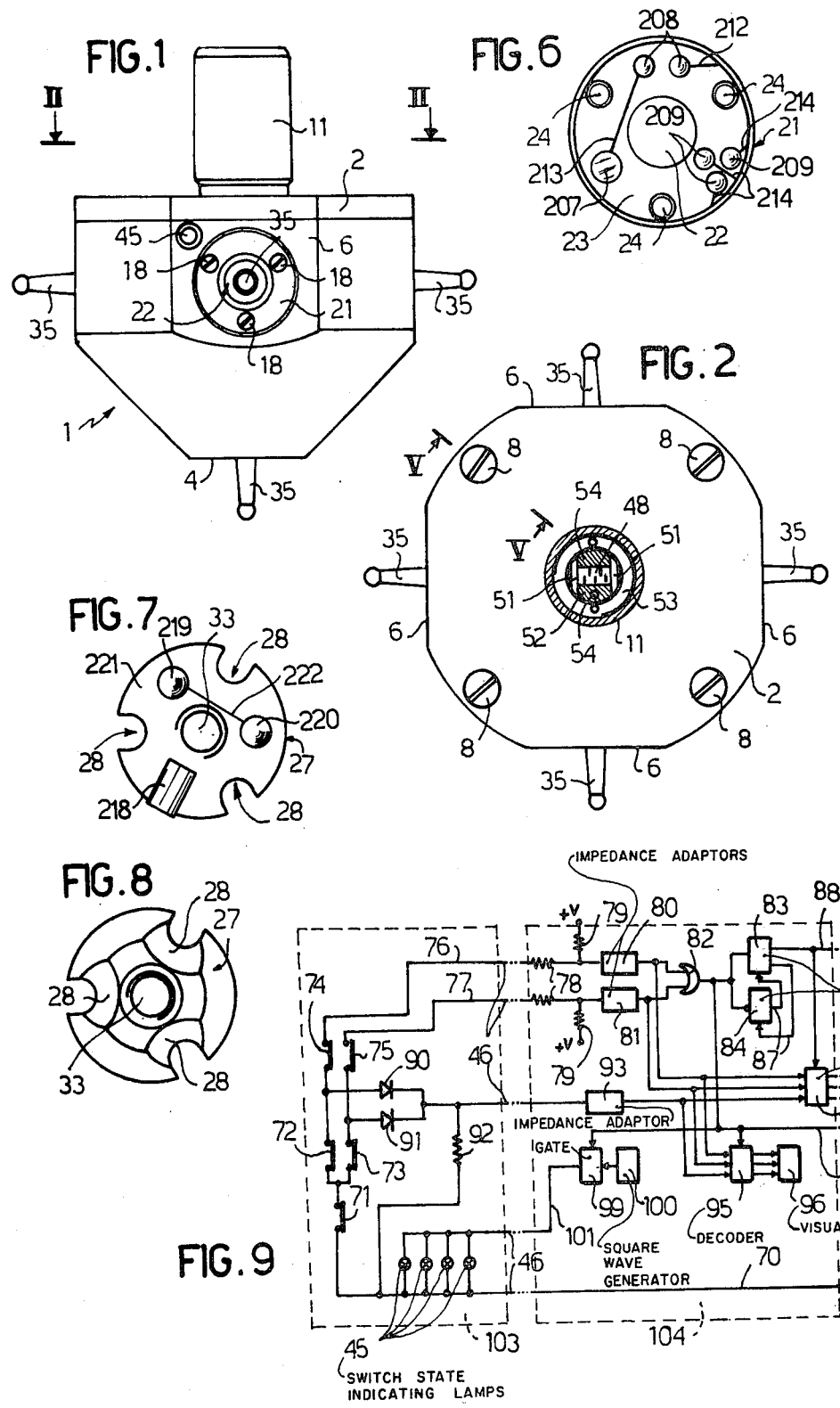

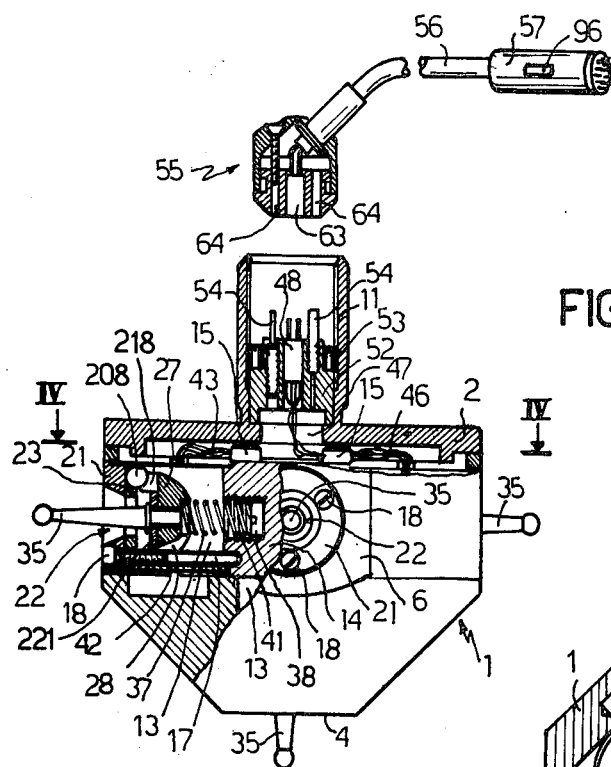
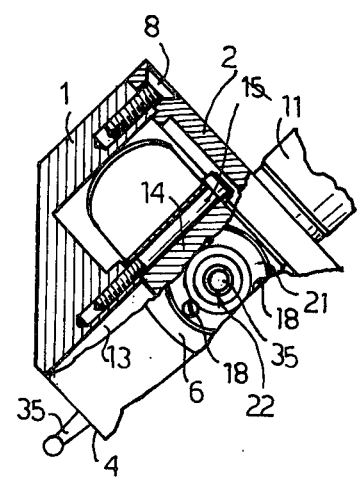
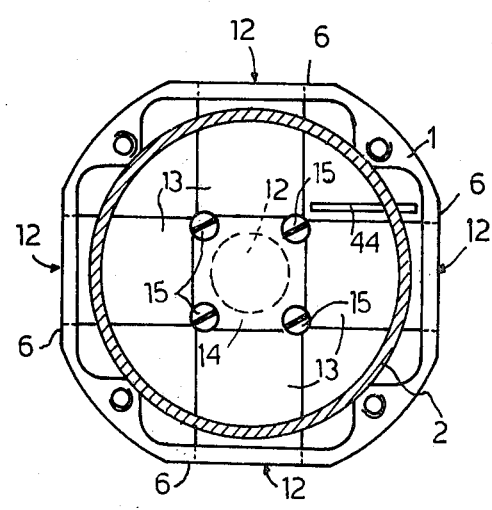
FIG. 3
FIG. 5
FIG. 4

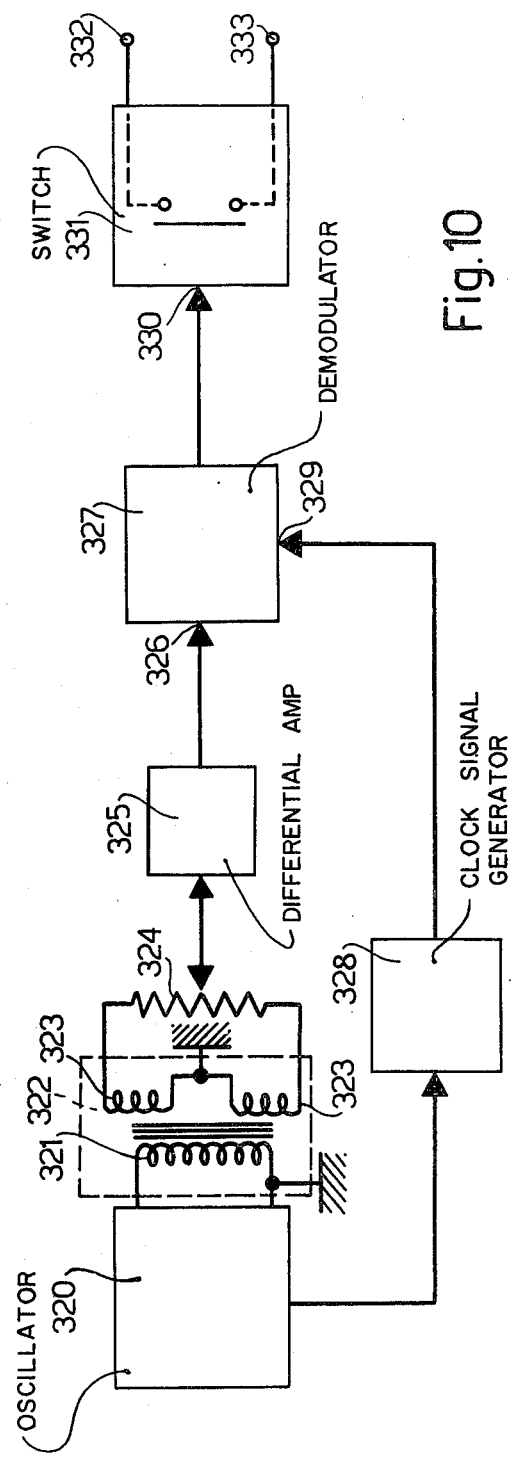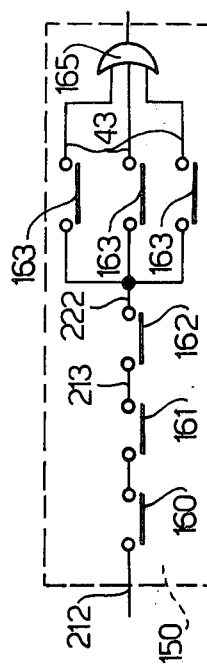

ELECTRONIC TRACER UNIT FOR MEASURING MACHINES

BACKGROUND OF THE INVENTION

The present invention relates to a tracer unit particularly suitable for use with measuring machines, comprising a plurality of tracer tools which generate an electric output signal for signalling a position of contact of the tracer tool with a workpiece, said position being signalled, in accordance with the type of tracer tool, either when the tracer tool leaves the position of equilibrium or when it passes through a position of equilibrium.

There are known individual tracer tools, both omnidirectional and bidimensional or unidimensional, i.e., in which the tip of the tracer tool is movable along three, or two, or one axis. For example, the tracer tools described in U.S. Pat. No. 4,023,045 of the same Applicant are electronic omnidirectional tracers of the type in which en electric signal is generated when the tracer leaves the position of equilibrium. Other tracer tools, bidimensional and unidimensional, are known for instance from the U.S. Pat. No. 3,727,119 and from the British patent specification No. 855,676.

When carrying out measurings on outer surfaces or in inner regions where it is possible for the whole column of the machine to be penetrated along its axis (axis z), or when utilizing bidimensional or unidimensional tracers, it is sometimes necessary to use tracer tools whose axis is disposed in successive stages along different directions. Therefore, it is necessary to detach the individual tracer tool from the head of the measuring machine and to substitute it or to dispose it in another position.

SUMMARY OF THE INVENTION

The object of the present invention is to provide a tracer unit comprising a plurality of tracer tools of the type mentioned hereinabove, which will allow carrying out, quickly and in a simple way, measurings on outer surfaces or in inner regions into which a penetration of the tracer unit is possible, without having to substitute the individual tracer tools for disposing them in different positions.

According to the present invention there is provided a tracer unit for use with measuring machines, comprising: a plurality of tracer tools, each of which is provided with a rod arranged to come into contact with a surface to be scanned, a movable body connected to said rod, a fixed body, first means which supply a first signal either when said movable body leaves the position of equilibrium relative to said fixed body or when said movable body passes through a determined position relative to said fixed body; and second means arranged to indicate from which the various tracer tools said first signal is originated.

BRIEF DESCRIPTION OF THE DRAWINGS

For a better understanding of the invention some embodiments thereof, given by way of a non limitative examples, will now be described with reference to the accompanying drawings, in which:

FIG. 1 is a side elevational view of a tracer unit according to the principles of the present invention;

FIG. 2 is a top view, sectioned along line II—II, of the tracer unit shown in FIG. 1;

FIG. 3 is a partially sectioned side elevational view of the tracer unit of FIG. 1, with a cable for connection to a measuring machine;

FIG. 4 is a top view, sectioned along line IV—IV, of the outer body of the tracer unit shown in FIG. 3;

FIG. 5 is a partial side elevational view, partially sectioned along line V—V, of the tracer unit shown in FIG. 2;

FIGS. 6, 7 and 8 are, respectively, a top view of the fixed body and a bottom and a top view of the movable body of the cutout device of each of the individual tracer tools included in the unit shown in FIG. 1;

FIGS. 9 and 10 are, respectively, a wiring diagram of the tracer unit according to the present invention and a wiring diagram of the cutout device of each of the individual tracer tools included in the unit shown in FIG. 1;

FIG. 13 is a block diagram of a portion of the electric circuit of the individual tracers included in the units shown in FIGS. 11 and 12.

DETAILED DESCRIPTION OF THE INVENTION

Figure 11:
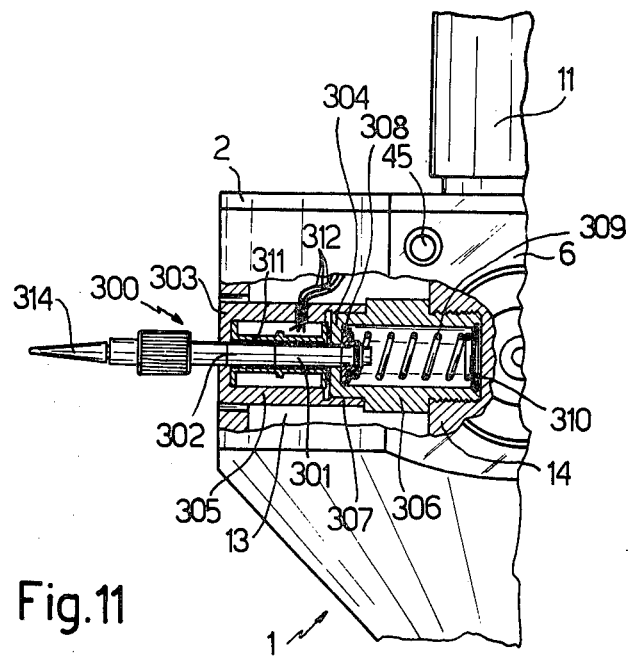
FIGS. 11 and 12 are part setioned side elevational views of parts of two further different embodiments of the tracer unit according to the present invention.

Referring now to Figures from 1 to 5, the tracer unit of the present invention comprises a container body 1 and an upper cover 2 fixed by means of four screws 8 (FIGS. 2 and 5). Container 1 has at its bottom end a plane surface 4 and at its upper end four chamfered plane portions 6 equispaced by 90° from each other. Formed centrally on the cover 2 and extending upwards is a cylindrical tang 11 having a ground surface and being provided with an inner thread, which is mechanically connected in a well-know manner to a head of a measuring machine (not shown). The plane bottom surface 4 and the four chamfered plane portions 6 of the body 1 have each a through hole 12 (FIG. 4), and such five holes 12 are coaxial with five recesses 13 formed inside the container 1. In a central region of the body 1 there is fixed by means of four screws 15 (FIGS. 4 and 5) a block 14 substantially cubic in shape. Glued onto each of, five sides of the block 14 are three posts 17 arranged in the respective recess 13 and equispaced by 120°. Connected to the lower end of the posts 17 by means of screws 18 is a fixed block 21 (FIGS. 3 and 6) in the shape of an annular crown with a frusto-conical central through hole 22. On the upper portion of said block 21, whose surface is rendered insulating, there is fixed an insulating cage 23 which is provided with three holes 24 for the passage of the posts 17 and from which there are projecting a metal block 207 having a plane surface, a pair of metal balls 208 and three metal balls 209, according to the configuration described in U.S. Pat. No. 4,023,045. The cage 23 carries also a printed circuit with an input connection 212 disposed between the outer edge of the cage 23 and one of the balls 208, a connection 213 disposed between the other ball 208 and the block 207, and three output connections 214 each of which is disposed between one of the balls 209 and the outer edge of the cage 23. Disposed on the fixed block 21 is a movable block 27 provided with three outer oblique grooves 28 (FIG. 8) disposed at 120°, which allow the passage of the posts 17. Fixed on the lower surface of said movable block 27, which is made to be insulating, is an insulating cage 221, from which project a pin 218 and two balls 219 and 220, according to the configuration already described in U.S. Pat. No. 4,023,045. This cage 221 too carries a printed circuit including a connection 222 disposed between the balls 219 and 220. In an axial threaded hole 33 of the movable block 27 there is screwed the end of a measuring rod 35 which comes out from the container body 1. Bearing in the upper zone of the movable block 27 is a cylindrical spring 37 whose other end bears against an adjusting screw 38 which is disposed in a threaded seating 41 formed in the central block 14.

Between the central block 14 and the respective fixed block 21, in each of the five recesses 13, there is disposed an annular cylindrical element 42 which carries a printed circuit whose terminals are connected to the input connection 212 and to the three output connections 214 of the cage 23. Cage 23 and cage 221 provide electric connections between the various elements (balls, blocks and pin) of the blocks 21 and 27, so as to define six switches connected in series and in parallel, which may be compared to a unitary cutout device arranged to supply a signal at the opening of anyone of said six switches. Referring to FIG. 10, said cutout device, indicated generally by reference numeral 150, is formed by the input connection 212 which arrives at the series of two switsches 160 and 161 provided by means of the two balls 208 cooperating with the pin 218. Switch 161 is connected, through the connection 213, to a switch 162 formed by the block 207 and the ball 219. The switch 162 is in its turn connected through the connection 222 to three switches 163 formed by the ball 220 and one of the three balls 209 respectively. Said three switches 163 are connected, by means of connections 43, to a logic OR gate 165 which is connected to a printed circuit 44 housed in the container 1 (FIG. 4). Connected to said printed circuit 44, which forms an intermediate connection element, are the connections 43 pertaining to the five tracer tools housed within the five recesses 13, as well as the connection wires from four signal lamps 45 disposed in the four chamfered plane portions 6. Said printed circuit 44 is connected through five connection wires 46, which pass through a central opening 47 of the cover 2, to the five lower contacts of a double electrical plug 48. Plug 48 is fixed by means of two pins 51 (FIG. 2) to a block 53 which is disposed inside the tang 11 and is positioned by means of a threaded locking ring 53 screwed into the threaded inner opening of the tang 11. Vertically screwed into the block 52 two centering pins 54 which project with two portions, one of which has a larger cross-section and the other one has a reduced cross-section. Insertable into the interior of the tang 11 (FIG. 3) is a connecting block 55 connected by means of a cable 56 to a union 57 which provides the electrical connection to the measuring machine. Disposed in the lower portion of the connecting block 55 are an electric plug 63 for connection to the double plug 48, and two seatings 64 for lodging therein the two centering pins 54.

The electric circuits of the tracer unit of the present invention are shown in FIG. 9 in which there is diagrammatically shown, as unitary cutout device, the switch 150 formed by the assembly of the six switches constituted by balls 208, 209, 219 and 220, pin 218 and block 207, for each of the five tracer tools forming the tracer unit of the present invention. Reference numeral 70 indicates a supply cable having a negative voltage, for instance of −12 volts, which arrives at a terminal of a switch 71 pertaining to the tracer tool whose measuring rod 35 projects from the lower plane surface 4. The other terminal of the switch 71 is connected to input terminals of two switches 72 and 73 pertaining to two tracer tools whose measuring rods 35 project from two orthogonal portions 6. The outputs of the switches 72 and 73 arrive at the inputs of other two switches 74 and 75 respectively which pertain to tracer tools whose measuring rods 35 project from portions 6 which are parallel respectively to the portions 6 of the rods 35 of the corresponding series switch 72 or 73. The output terminals of the switches 74 and 75 are connected by connections 76 and 77 to impedance adaptor blocks 80 and 81, through resistore 78 in series and resistors 79 branched from a supply source having a voltage +V, conveniently of +5 Volts. The outputs of the two blocks 80 and 81, which are apt to supply in output a signal at logic level, arrive at a logic adder circuit 82 of the type OR, whose output arrives at the inputs which are respectively complementary of two memory circuits 83 and 84, and at an output connection 86. The circuits 83 and 84, which conveniently comprise monostable multivibrators, are arranged to be activated on mutually opposite wave fronts, do not accept successive signals of the same type for a predetermined period of time, and are each provided with an output connection 87 arranged to lock for a pre-established period of time the operation of the other circuit. The output of the circuit 83 transmits, through a connection 88, a measuring signal to the measuring machine.

The connections of the switches 72, 74 and 73, 75 respectively are connected to the anodes of two diodes 90 and 91 whose cathodes are connected, through a resistor 92, to the connection 70 and, directly, to an impedance adaptor block 93. The outputs of the adaptor blocks 80, 81 and 93 arrive at the input of a memory circuit 94 at which arrives also, as consent signal, the output of the circuit 83; said circuit 94 supplies the output signals to the measuring machine. The outputs of the blocks 80, 81 and 93 arrive also at the inputs of a decoder circuit 95 which receives also the output of the OR circuit 82; circuit 95 supplies control signals to a visualizer 96 having seven segments, which is disposed inside the union 57 (FIG. 3). The output of the logic OR circuit 82 arrives also, as consent signal, to a gate circuit 99, at which arrives a signal from a generator 100 which generates square waves at low frequency, for example of 4 Hz. Originating from circuit 99 is an output connection 101 which feeds the four signal lamps which are connected to the connection 70. The circuit shown in FIG. 9 is included in two dashed portions 103 and 104 respectively, the first of which is disposed inside the container 1 and on the printed circuit 44, whilst the second is disposed inside the union 57. The connections between said portions 103 and 104 is obtained by means of five connection wires formed by the wires 46, the five contact plugs 48 and 63 and the cable 56 (FIG. 3).

The operation of the tracer unit described hereinabove, provided by the present invention, is as follows.

When the ends of each of the five measuring rods 35 are not in contact with the surfaces to be scanned, they are disposed in the position of equilibrium determined by the movable block 27 being pressed against the fixed block 21, under the action of the spring 37; namely, the ball 220 bears on the three balls 209, the pin 218 bears on the two balls 208, and the ball 219 bears on the plane block 207. When the end of one of the measuring rods 35 meets the surface which has to be scanned, it inclines and/or lifts the movable block 27 and therefore at least one of the switches 160, 161, 162 and 163 shown in FIG. 10 is opened, so that the switching assembly 150 of the tracer tool results in being open in its generality and a signal of a different type, for instance of the type "1", is obtained at the output of the OR gate 165. Whatever tracer tools results in being involved in the measuring stage, and accordingly whatever switch 71, 72, 73, 74 or 75 opens, the potential of one of the connections 76 and 77, or of both of them, changes and a different signal, for example a signal of the type "1", is obtained at the output of the block 80 or 81 or of both of them. Accordingly, a signal of the type "1" is obtained at the output of the OR circuit 82 and consequently circuit 83 is activated, which circuit sends the measuring signal, along the connection 88, to the measuring machine and locks the circuit 84 for a convenient period of time, for example of 0.1 seconds, through the connection 87. Through the connection 86 there is obtained also the transmission of a signal to the machine, which signal informs about the open condition of any switch pertaining to one of the tracer tools. The signal of the type "1" at the output of the circuit 82 drives the circuit 99, allows the feeding of the low frequency signal from generator 100 to the four signal lamps 45 which are periodically lighted and extinguished so as to be visible by an operator in practically position of the tracer unit, in order to signal such open condition of the individual tool.

However, it is also necessary to send to the measuring machine an information about which of the five switches 71, 72, 73, 74, 75 pertaining to the five tracer tools is open. Such information is transmitted through the outputs of the blocks 80, 81 and 93 whose output logic level combination changes as a function of the switch which has been opened. In fact, the opening of the switch 71 causes a change of the level at the output of the blocks 80 and 81. The opening of the switches 72 or 74 causes a change of the level at the output of the block 80, whilst the opening of the switch 73 or 75 causes a change of the level at the output of the block 81. The identification of the opening of the switch 72 or 74, as well as the identification of the opening of the switch 73 or 75 takes place on the basis of the variation of logic level of the signal at the output of the block 93. Therefore, the combination of the signals at logic levels "0" and "1" at the output of the blocks 80, 81 and 93, which identifies as a number in binary form the tool which has moved away from the position of equilibrium, and which is present at the inputs of the memory circuit 94, is memorized, by means of the consent of the of the signal taken from the output of the circuit 83 and present, as explained above, when any one of the switches 71, 72, 73, 74 or 75 opens. Therefore, at the outputs of the circuit 94 there becomes present the number in binary form which identifies the tool which has moved away from the position of equilibrium, and this information, which is supplied to the machine, will be utilized by the machine itself at the right moment. The combination of the signals at logic levels at the outputs of the blocks 80, 81 and 93, which identifies the operated tool as a number in binary form, are decoded by the decoder circuit 95, under the consent signal of the type "1" at the output of the circuit 82, for driving the inputs of the visualizer 96 of the "7 segments type", which therefore gives the indication of a digit in decimal form corresponding to the number of the tool which has moved from the position of equilibrium, and such indication is visible to the operator, on the union 58. Therefore, when one of the tools moves away from the position of equilibrium, there is a general indication of this condition, in the form of a signal present on the connection 86 and sent to the machine, and in a visible form through the periodic lighting and extinguishing of all the lamps 45, and moreover there is an indication of which of the various tools has been moved, in the form of a signal combination present at the output of the circuit 94 and available to the machine, and in a visible form through the indication of a corresponding digit in decimal form on the visualizer 96.

Successively, when the tracer tool returns to the position of equilibrium, under the action of the spring 37, the switching assembly closes and cosequently a signal of the type "0" is obtained at the output of the circuit 82. Thus, circuit 84 is activated and locks the operation of the circuit 83 for a period of time of, for example, 0.1 seconds. In such condition of stable equilibrium there occurs also the transmission to the machine, along the output connection 86, of the signal informing about the condition of closure of the switches, and such signal of type "0", at the output of the circuit 82, by controlling the gate block 99 cuts off the supply to the signal lamps 45, which thus are extinguished again. In this way, whilst in the memory circuit 94 there remains memorized, as long as no new condition of opening of a switch arises again, the combination of signals at logic levels which identifies as a number in binary form the tool which has moved away from the position of equilibrium in fact no new consent signal arrives from the output of the circuit 83 to store in the circuit 94 the new input signals, the signal at the logic level "0" from the circuit 82 blocks the decoder circuit 95 which therefore does not supply the visualizer 96. Since the visualizer 96 gives no indication, it indicates that all the switches are closed.

Figure 12:
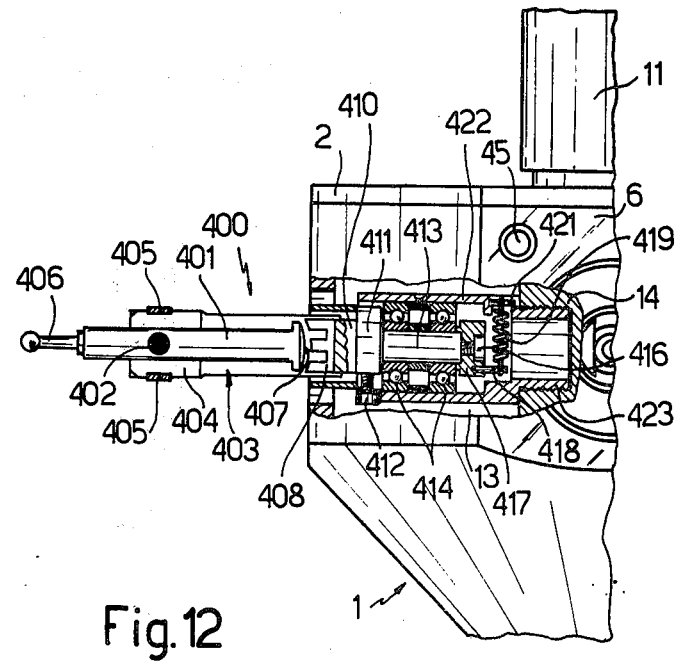

The tracer unit according to the present invention, instead of being provided with three dimensional tracer tools, may be provided with unidimensional tracer tools, as shown in FIG. 11, or with bidimensional tracer tools, as shown in FIG. 12. In fact, the tracer unit shown in FIG. 11 has five unidimensional tracer tools 300, each of which is housed in the corresponding recess 13 inside the container 1. Each of said tracers 300 is provided with a cylindrical rod 301, to which there is connected a measuring tip 314 and on which there is inserted a cylindrical core 302 made of a magnetic material, for example soft iron. The rod 301 slides in two bushings 303 and 304, the first of which pertains to a hollow cylindrical body 305, whilst the second pertains to a hollow cylindrical body 306. The upper section of the body 306 is threaded and connected to the central block 14, whilst the body 305, which is disposed coaxially with the body 306 and outside of it, has an upper section 307 which is disposed around the lower end of body 306 and is fixed to the latter. Fixed to the upper end of the rod 301 is a cup 308 which abutting against the inner base surface of body 306 limits the external range of movement of the rod 301 and also serves as a support for a cylindrical spring 309, disposed inside body 306, which spring on the other side bears against a cap 310 fixed to the body 306. Disposed inside the body 305, coaxially with respect to the rod 301, is a cylindrical support 311 for a series of windings of a differential transformer (not shown), which windings are connected by connections wires 312 to the printed circuit 44. The differential transformer and the corresponding electric circuit of the tracer tool in FIG. 11, are represented in FIG. 13 in which an oscillator 320 having a high frequency, for example of 50 KHz, feeds a primary winding 321 of said differential transformer 322 which is disposed inside the cylindrical support 311. The differential transformer 322 has two secondary windings 323 which have one end connected together and the other end connected to the ends of a potentiometer 324. The common end of the secondary windings 323 and one end of the primary winding 321 are connected to earth. The slider of the potentiometer 324 is connected to the inverting input of a differential amplifier 325 which provides a threshold comparator with hysteresis, whose output arrives at an input 326 of a demodulator 327 which may conveniently be a bistable multivibrator. Oscillator 320 supplies also a generator 328 which generates clock signals and whose output is connected to another input 329 of the demodulator 327. The output of demodulator 327 is connected to a control input 330 of a block 331 which is provided with two outer terminals 332 and 333 and whose operation may be compared with that of a switch. Said block may for example comprise a field effect transistor.

The operation of the tracer unit of FIG. 11, with reference to the diagram of FIG. 13, is as follows. In rest conditions, when the ends of the five measuring tips 314 are not in contact with the surface which has to be scanned, because of the action of the spring 309 the rod 301 is in the position shown in the Figure, having a greater external extension, and the core 302 gives rise within the secondary windings 323 of the differential transformer 322 to waveforms such that, when taken from the potentiometer 324 and supplied, through the differential amplifier 325, to the input 326 of the demodulator 327 where they are compared with the signals present at the input 329 and coming from the generator 328, at the output of the demodulator 327 there is obtained a signal of constant value which arrives at the input 330 of the block 331 and maintains in a constant configuration (for example, closed) the equivalent switch between the terminals 332 and 333. When the end of one of the tips 314 meets the surface to be scanned, the rod 301 enters again the bodies 305 and 306, and the core 302, by passing through a position of electrical equilibrium relative to the position of the two secondary windings 323 of the differential transforme 322, gives rise in said secondary windings 323 to waveforms having a changed amplitude, which are such that the signal taken from the slider of the potentiometer 324 results in having an inverted phase, and by means of the demodulator 327 which compares the changed signal of the differential amplifier 325 with the always identical signal, at frequency of 50 MHz, of the generator 328, there is obtained at the output of the demodulator 327 a signal of different constant value which arrives at the input 330 of the block 331 and maintains in a complementary constant configuration (for example, open) the equivalent switch between the terminals 332 and 333. Since the behaviour of the block 331 may be compared to that of a switch, each block 331 pertaining to the five tracer tools of the tracer unit may be compared to one of the five switches 71, 72, 73, 74 and 75 of the diagram of FIG. 9, which thus has an operation identical to that described before, and there is obtained an identical indication as to which of the five tracer tools has carried out the scanning.

With reference to FIG. 13, all the various elements shown, except the differential transformer 322, may conveniently be disposed on the printed circuit 44.

The trcer unit of FIG. 12 has five bidimensional tracer tools 400, each of which is housed in the corresponding recess 13 inside the container 1. Each tracer tool 400 has a scanning rod 401 provided with a measuring tip 406 and connected by means of a pin 402 ot a supporting structure 403 formed by two side walls 404 connected to parts 405. Fixed to the rear end of the rod 401 is a core 407 made of a magnetic material, for example ferrite, whose heading surface has a contour extending along an arc of a circle. Confronting the core 407 is an E-shaped core 408 of magnetic material, such as ferrite, with the three arms which terminate, generally, according to the contour of an arch of a circle concentric with that of the core 407. On the central arm of the core 408 there is wound a primary winding of a differential transformer, whilst on the two side arms of the core 408 there are wound the secondary windings of the differential transformer. Said windings are not shown, but they correspond to the windings 321 and 323 of the differential transformer 322 shown in FIG. 13. The core 408 is fixed to a body 410, to which there is fixed also the upper portion of the supporting structure 403, and has also a portion 411 of circular cross-section, to which there is fixed a screw 412, and a cylindrical portion 413 which is inserted into a double cage bearing 414. Fixed to the upper end of the cylindrical portion 413 by means of a screw 416 is a body 417 having fixed thereto a pin 418 to which there is connected the end of a spring 419 whose other end is connected to a pin 421 fixed to a container 422 in the shape of a hollow cylinder, which encloses the cylindrical portion 413 and has an externally threaded upper portion 423 which is screwed onto the central block 14. Container 422 has at its lower portion a missing section extending along a sector of 90°, which limits to such value the angular movement of the screw 412.

The operation of the tracer unit shown in FIG. 12 which utilizes the same electric diagram shown in FIG. 13, is as follows. In the rest condition, in which the ends of the five measuring tips 406 are not in contact with the surface to be scanned, the rod 401 is inclined and the core 407, which is not in the position of equilibrium relative to the core 408, gives rise in the differential transformer 322 to such waveforms that the equivalent switch between terminals 332 and 333 of the block 331 remains in a constant condition (for example, closed). As the end of one the tips 406 meets the surface to be scanned, the rod 401 rotates about the pivot 402 and the core 407, by passing through a position of electrical equilibrium with respect to the core 408, gives rise in the differential transformer 322 to waveforms which are such that the equivalent switch between the terminals 332 and 333 of the block 331 assume the complementary condition (for example, closed). Therefore, the operation of the diagram of FIG. 9, for the tracer unit of FIG. 12, is identical to that already described for the tracer units of FIGS. 11 and 3. Said tracer tool 400 may carry out scannings in two directions orthogonal to one another; in fact, when rotating through 90° the supporting structure 403, which rotation is limited by the head of the screw 412 which abuts against the edges of the removed section at the lower end of the body 422, the rod 401 may rotate in a direction orthogonal to the former. The spring 419, which results in being stretched in the two positions of the supporting structure 403 which are orthogonal to one another, serves to maintain the stability of said two positions.

The tracer unit of the present invention, described hereinabove, has many advantages of being conveniently and reliably operable and of having a relatively simple construction. First of all it allows carrying out scannings in different directions in a very simple way, without having to substitute the tracer tool or to change its position, by simply utilizing a different one of the five measuring rods.

Thus, the tracer unit of the present invention affords convenient combinations of tracer tools of the unidimensional or bidimensional type for obtaining performances which otherwise would be obtainable by means of tracer tools of the three dimensional type. The indication as to which of the five tracer tools has carried out the scanning and has therefore moved away from the position of equilibrium or has passed through the position of equilibrium, takes place at logic levels, and there are obtained a memorized signal which arrives at the measuring machine when required, and a signal which arrives at a visualizer device for the operator. The particular mutual connection of the switching assemblies pertaining to the five tracer tools allows having an electric connection between the tracer unit and the union of attachment to the machine, by means of only five connection wires, which allows a simple construction of the tracer unit.

Finally, it is obvious that modifications and variations of the embodiment described hereinabove might be possible both in the shape and arrangement of the various component parts, without departing from the scope of the present invention. For example, in a single tracer unit there may also be included single tracer tools of different types, i.e., three dimensional and/or bidimensional and/or unidimensional tracer tools.

The tracer unit of the present invention may also include tracer tools constructed in a different way with respect to each other; thus, it may also include tracer tools of the type described in the U.S. Pat. No. 3,727,119 or of the type described in the British patent specification No. 855,676. Also, it may include tracer tools of a known type different from those mentioned hereinabove, for example tracer tools in which the detection of the contact may be achieved through variation of a capacity, or by means of an emitter and a corresponding receiver for example of the photoelectric type or of the laser ray type, or also in another way.

What we claim is:

1. Tracer unit for use with measuring machines, comprising: a plurality of tracer tools, each of which is provided with a rod arranged to come into contact with a surface to be scanned, a movable body connected to said rod, a fixed body, first means which supply a first signal either when said movable body leaves the position of equilibrium relative to said fixed body or when said movable body passes through a determined position relative to said fixed body, second means arranged to indicate from which of the various tracer tools said first signal originated, and a single body for housing and supporting said plurality of tracer tools, the rods of each of said tracer tools projecting from said single body, and said rods of said tracer tools, in said equilibrium position or in said determined position of said movable body, being disposed at least along two mutually orthogonal directions.

2. The tracer unit of claim 1, wherein said movable body and said fixed body comprise electric contact elements forming, in combination, a switch; said first signal from said first means being originated at the opening (or at the closing) of said switch.

3. The tracer unit of claim 1, wherein said movable body and said fixed body comprise elements forming, in combination, a differential transformer pertaining to said first means.

4. The tracer unit of claim 3, wherein said differential transformer supplies a signal for controlling the condition of an element acting as a switch, said first signal from said first means being originated at the opening (or at the closure) of said switch.

5. The tracer unit of claim 2, wherein said switches of said tracer tools are connected in series, from said first means there being obtained said first signal at the opening of any one of said switches.

6. The tracer unit of claim 4, wherein said switches of said tracer tools are connected in series, from said first means there being obtained said first signal at the opening of any one of said switches.

7. The tracer unit of claim 2, wherein said second means comprise circuits connected to said switches and arranged to supply in output signals at logic level, said signals of said second means giving rise to a combination of signals at logic level which indentifies the open switches and consequently the corresponding tracer tool.

8. The tracer unit of claim 4, wherein said second means comprise circuits connected to said switches and arranged to supply in output signals at logic level, said signals of said second means giving rise to a combination of signals at logic level which indentifies the open switch and consequently the corresponding tracer tool.

9. The tracer unit of claim 7, wherein said combination of signals at logic level is stored in a memory circuit and successively utilized by the measuring machine.

10. The tracer unit of claim 7, wherein said combination of signals at logic level is transmitted to a digital visualizing device.

11. The tracer unit of claim 1, wherein said first output signal from said first means controls the feeding of a plurality of lamps which signal the condition of closure or opening of said switches.

12. The tracer unit of claim 1, wherein to said single body for housing said tracer tools there is connectable a cover provided with a tang for the mechanical connection to a head of a measuring machine, in said tang there being disposed an electric connection plug and at least one centering pin, for the electrical and mechanical connection to a connector block of a cable of connection to a measuring machine.

13. The tracer unit of claim 12, wherein in a connection union of said cable of connection to the measuring machine is housed a digital visualizing device receiving said combination of signals at logic level.

14. The tracer unit of claim 13, wherein said first and said second means are provided by means of miniaturized electric and electronic circuits and are housed inside said body which accomodates said tracer tools, and inside said union.

15. The tracer unit of claim 1, wherein the tracer tools are of the three-dimensional type.

16. The tracer unit of claim 1, wherein the tracer tools are of the bidimensional type.

17. The tracer unit of claim 1, wherein the tracer tools are of the unidimensional type.

18. The tracer unit of claim 2, wherein said switches of said tracer tools are connected in parallel, from said first switch means there being obtained said first signal at the opening of any one of said switches.

19. The tracer unit of claim 4, wherein said switches of said tracer tools are connected in parallel, from said first means there being obtained said first signal at the opening of any one of said switches.

* * * * *